(12) United States Patent
Johannessen et al.

(10) Patent No.: US 6,970,625 B2
(45) Date of Patent: Nov. 29, 2005

(54) OPTIMIZED Y-BRANCH DESIGN

(75) Inventors: Kjetil Johannessen, Trondheim (NO); Ansheng Liu, Cupertino, CA (US); Henning Jansen, Trondheim (NO)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 10/193,798

(22) Filed: Jul. 12, 2002

(65) Prior Publication Data

US 2004/0008944 A1 Jan. 15, 2004

(51) Int. Cl.$^7$ ................................................ G02B 6/26
(52) U.S. Cl. ........................................ 385/45; 385/43
(58) Field of Search ..................................... 385/45, 43

(56) References Cited

U.S. PATENT DOCUMENTS

| | | | | | |
|---|---|---|---|---|---|
| 5,712,935 | A | * | 1/1998 | Miyakawa | 385/22 |
| 5,757,990 | A | * | 5/1998 | Miyakawa | 385/16 |
| 5,757,995 | A | * | 5/1998 | Chen et al. | 385/45 |
| 6,553,164 | B1 | * | 4/2003 | Ono et al. | 385/45 |
| 6,810,167 | B2 | * | 10/2004 | Tabuchi et al. | 385/24 |
| 2002/0085791 | A1 | * | 7/2002 | Kim | 385/16 |
| 2003/0021536 | A1 | * | 1/2003 | Sakuma et al. | 385/45 |

FOREIGN PATENT DOCUMENTS

| JP | 09211244 A | * | 8/1997 | G02B/6/122 |
|---|---|---|---|---|

OTHER PUBLICATIONS

Aarnio et al. "Birefringence Control and Dispersion Characterics of of Silicon Oxynitride Optical Waveguides" *IEEE Electron. Lett., Electron. Lett.*, 27(25), pp. 2317–2318 (Dec. 1991).

Absil et al. "Vertically Coupled Mircroring Resonators Using Polymer Wafer Bonding" *IEEE Photonics Technology Letters*, 13(1), pp. 49–51 (Jan. 2001).
Chapter 5—Material Properties, U.S. Army Corps of Engineers, Publication ETL 1110–2–548 (1997), pp. 5–1 to 5–8.
Eldada, et al. "Thermo–optically active polymeric photonic components," pp. 124–126.
Fischer et al., "Elastooptical Properties of SiON Layers in an Integrated Optical Interferometer Used as a Pressure Sensor", *IEEE Journal of Lightwave Technology*, 12(1), pp. 163–169 (Jan. 1994).
Gorecki "Optimization of Plasma–Deposited Silicon Oxinitride Films for Optical Channel Waveguides" *Optics and Lasers in Engineering*, 33, pp. 15–20 (2000).
Hoffmann et al., "Low–Loss Fiber–Matched Low–Temperature PECVD Waveguides with Small–Core Dimensions for Optical Communication Systems" *IEEE Photonics Technology Letters*, 9(9), pp. 1238–1240 (Sep. 1997).
Hwang et al., "Polarization Stabilizer Using a Polarization Splitter and Termooptic Polymer Waveguide Device" *IEEE Photonics Technology Letters*, 10(12), pp. 1736–1738 (Dec. 1998).

(Continued)

*Primary Examiner*—Michelle R. Connelly-Cushwa
(74) *Attorney, Agent, or Firm*—Marshall Gerstein & Borun LLP

(57) ABSTRACT

Optical structures useful in splitters, couplers, combiners, and switches are provided. An example optical structure has a Y-branch configuration that includes a linear taper segment and two branching waveguides. A straight section extends between the linear taper segment and the two branching waveguides to reduce losses during splitting/combining operation. The straight section may be used in Y-branch configurations having a blunt section, as well as configurations without a blunt section. Straight sections formed of a single segment and of multiple segments are shown, and the straight sections may be formed of substantially parallel outer walls or fanning-out outer walls. Further, in some embodiments, the branching waveguides form acute angles at the boundaries with the straight segment.

15 Claims, 6 Drawing Sheets

OTHER PUBLICATIONS

Kaneko, et al. "Design and Applications of Silica–Based Planar Lightwave Circuits," *Journal of Selected Topics in Quantum Electronics* 5(5):1227–1236 (1999).

Hattori, et al. "PLC–Based Optical Add/Drop Switch with Automatic Level Control," *Journal of Lightwave Technology* 17(12):2562–2570 (1999).

Keil, et al. "Thermo–Optic vertical coupler switches using hybrid polymer/silica integration technology," *Electronics Letters* 36(5):430–431 (2000).

Kobayashi et al., "Fluorinated Polymide Waveguides with Low Polarization–Dependent Loss and Their Applications to Termooptic Switches" *IEEE Journal of Lightwave Technology*, 16(6), pp. 1024–1029 (Jun. 1998).

Layadi, et al. "Low–loss optical waveguide on standard SOI/SIMOX substrate," *Optics Communications* 146:31–33 (1998).

Martinu et al. "Plasma Deposition of Optical Films and Coatings: A Review" *J. Vac. Sci. Technol. A*, 18(6), pp. 2619–2645 (Nov./Dec. 2000).

Müller et al., "Micromechanical Structures With Optical Detection Integrated on Silicon" *IEEE* (1996).

Nadler, et al. "Polarization Insensitive, Low–Loss, Low–Crosstalk Wavelength Multiplexer Modules," *Journal of Selected Topics in Quantum Electronics* 5(5):1407–1412 (1999).

Takagi et al., "Silica–Based Waveguide–Type Wavelength–Insensitive Couplers (WINC's) with Series–Tapered Coupling Structure" *IEEE Journal of Lightwave Technology*, 10(12), pp. 1814–1824 (Dec. 1992).

Takagi, et al., "Wavelength Characteristics of (2×2) Optical Channel–Type Directional Couplers with Symmetric or Nonsymmetric Coupling Structures," *Journal of Lightwave Technology* 10(6):735–746 (1992).

Takagi, et al., "Design and Fabrication of Broad–Band Silica–Based Optical Waveguide Couplers with Asymmetric Structure," *IEEE Journal of Quantum Electronics* 28(4):848–855 (1992).

Toyoda et al., "Low Crosstalk and Low Loss 2×2 Thermo–optic Digital Optical Switch using Silicone Resin Waveguides" *IEEE Elecron. Lett.*, 36(21), pp. 1803–184 (Sep. 4, 2000).

Watanabe, et al. "Polymeric Optical Waveguide Circuits Formed Using Silicone Resin," *Journal of Lightwave Technology* 16(6):1049–1055 (1998).

Wörhoff et al. "Design, Tolerance Analysis, and Fabrication of Silicon Oxynitride Based Planar Optical Waveguides for Communication Devices" *IEEE Journal of Lightwave Technology*, 17(8), pp. 1401–1407 (Aug. 1999).

Wörhoff et al., "Birefringence Compensation in Double–Core Optical Waveguides" *ECOC*, 20(24), pp. 605–606 (Sep. 1998).

Wörhoff et al., "Birefringe Compensation Applying Double–Core Waveguiding Structures" *IEEE Photonics Technology Letters*, 11(2), pp. 206–208 (Feb. 1999).

* cited by examiner

OPTIMIZED Y-BRANCH DESIGN

FIELD OF THE INVENTION

The present invention relates generally to optical splitters and couplers and, more specifically, to such structures having a Y-branch configuration.

BACKGROUND OF THE RELATED ART

The components used in optical networks are often complex structures, individually fabricated for specific applications of use. Though complex overall, many of these components are formed of relatively simple individual optical devices combined to achieve complex functionality. Just as the advent of semiconductor logic gates facilitated the creation of the microprocessor, the development of simple optical devices performing functions such as coupling, splitting, and constructive/destructive interference allows system designers to form increasingly more complex optical circuits.

Of the various basic optical structures, signal splitting/combining is one of the most important. Generally, splitting/combining is achieved through either direct or indirect coupling means. Indirect coupling, for example, relies upon evanescent field coupling through two close proximity waveguides, one being a source waveguide. Direct coupling instead involves bringing an input waveguide (or propagating medium) in direct physical contact with one or more output waveguides. Y-branches and multimode interference (MMI) couplers are two examples of direct coupling structures that can be used to split an optical signal or combine multiple optical signals.

Y-branches are the most common direct coupling structures for splitters/combiners. Planar lightwave circuits (PLCs), integrated optics and lasers have all been shown with Y-branches. Y-branches are currently used as power splitter/combiners in branching tree configurations and in interferometers. The former are typically stand alone structures that are not phase sensitive, whereas the latter are used in filter designs (e.g., channel interleavers in dense-wavelength division multiplexing (DWDM) systems) and are phase sensitive. Both types of Y-branches have their limitations. The latter phase-sensitive devices, for example, are sensitive to small variations in device performance, and, for a splitter, a small change in the splitting ratio may render an entire optical device inoperable.

Y-branches are formed of a straight input waveguide (for receiving an input signal) and two output waveguides that meet at the linear waveguide. Where the two output waveguides meet, a sharp inner edge is formed forming equal branching angles for the two output waveguides. The two output waveguides are typically S-shaped waveguides branching off from this sharp inner edge.

Unfortunately, state of the art Y-branches lose a sizeable amount of input energy due to limitations in device fabrication. Y-branch fabrication is a lithographic process in which high-quality lithography equipment, such as E-beam lithography equipment. Even with such equipment, it is difficult to fabricate well-aligned and symmetric output waveguides especially at the smaller sizes. Even if perfect alignment were to be achieved in one device, reproducing that alignment across a batch of fabricated devices is not likely.

To avoid the cost associated with such high-quality lithography equipment, lower quality lithography techniques are used. Of course, there is a quality tradeoff, and the equipment results in non-ideal Y-branch fabrication—a problem most noticeable at the inner edge where the two output waveguides of the Y-branch are to meet.

To facilitate more affordable lithography techniques, a few have used blunts to eliminate the splitting mismatch that occurs with poor-quality inner edges. Blunts, therefore, can correct for fabrication defects batch-to-batch or device-to-device. Yet, though useful in correcting for splitting ratio errors, current blunt designs result in a measurable overall loss of input signal power. For example, each output branch in a 50/50 splitter receives much less than the ideal 50% of the input power, due to blunt inducted losses. The losses are in part due to mode confinement of the input signal to the middle of the blunt section, i.e., between the two output waveguides and not at their input faces limitations. In short, blunts eliminate inner-edge error that results from fabrication, but do so by sacrificing signal power. As provided in the foregoing, there is a tradeoff with fabrication techniques and device performance for known Y-branch structures.

DETAILED DESCRIPTION OF PREFERRED EXAMPLES

While preferred examples and numerous alternatives thereto are provided below, it will be appreciated by persons of ordinary skill in the art that these are merely examples and are not intended to be exhaustive. On the contrary, the teachings herein may be used to form a great many optical splitters/combiners and other optical structures. Furthermore, while approaches are described in the context of forming Y-branch optical splitters/combiners, the teachings herein may be used to form integrated optical circuits.

Figure 1:
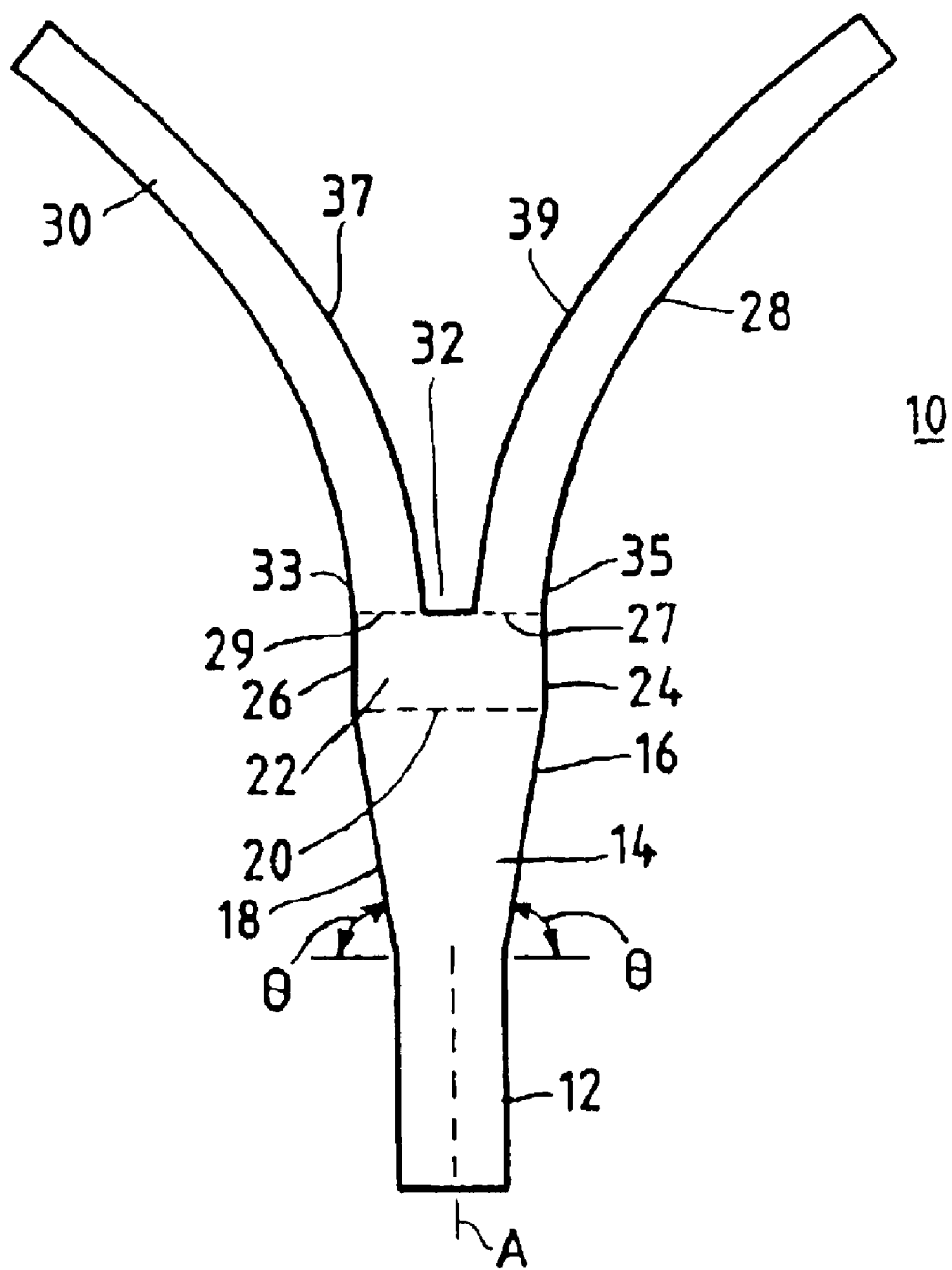
FIG. 1 is a top view of an example Y-branch having a first straight section.

FIG. 1 illustrates a top view of an example Y-branch 10. For simplification purposes, the Y-branches herein will be described operating as splitters, though persons of ordinary skill in the art will recognize that the structures shown may be used as signal couplers or combiners.

The Y-branch 10 includes an input straight waveguide section 12, in the form of a single-mode waveguide having a fully excited fundamental mode. The input section 12 (along with all of the other segments of the Y-branch 10) is formed of an optically transparent material (e.g., a material having a low-loss at desired communications wavelengths like 1310 nm and 1550 nm). The input section is coupled, through suitable ways, to receive an input signal propagating along a propagating axis, A.

The straight section 12 is capped at a leading edge with a linear taper region or section 14, having two outer walls 16, 18 forming an angle, θ, with an axis orthogonal to a direction of propagation of a signal within the section 12 and, therefore, forming an angle with the propagation axis, A. The angle, θ, is identical for both walls 16, 18 to facilitate equal (50/50) splitting of the Y-branch, though it will be appreciated by persons of ordinary skill in the art that the angles on walls 16 and 18 may be different to alter the splitting ratio of the device and the amount of power coupled into the outputs of the Y-branch 10.

The linear taper section 14 is shown terminated, orthogonally to the propagation axis, A, by a dashed line 20 abutting a straight section 22. The straight section 22, as shown, has the same width as line 20, i.e., the largest width of the linear taper section 14. The straight section 22 further includes outer walls 24 and 26 that are parallel to the propagation axis, A. The straight section 22 extends from the leading edge of the taper section 16 (i.e., dashed line 20) to a trailing edge 27 of a first output waveguide 28, a trailing edge 29 of a second output waveguide 30, and a gap 32. Though the walls 24 and 26 in the example shown in FIG. 1 are parallel, alternatively the walls 24 and 26 may fan-out from the propagation axis, A, each forming an angle therebetween. Further, in the depicted example the trailing edges 27 and 29 are parallel to line 20, but these edges 27 and 29 may instead form an angle with the line 20, such that inner walls 33 and 35 are closer to line 20 than outer walls 37 and 39, respectively.

As used herein, references to the trailing edge of a structure generally refers to the edge (or face or cross-sectional area) first seen by a signal propagating from an input portion of that structure to an output portion, and the leading edge refers to an edge (or face or cross-sectional area) seen by that signal after the trailing edge.

The output waveguides 28 and 30 are symmetrical about the propagation axis, A, and the waveguides 28, 30 have identical branching angles, or branch bending characteristics. As will be appreciated by persons of ordinary skill in the art, this configuration forms an equal (50/50) splitter for any input signal in section 12, irrespective of wavelength. The output waveguides 28, 30 are portions of S-bend waveguides that propagate split signals through a generally S-shaped bend until the split signals realign along the original direction of propagation of the input signal, i.e., the propagation axis, A.

The output waveguides 28, 30 may alternatively be straight branching waveguides diverging from gap 32 at their trailing edges. In some configurations, straight branching waveguides may offer less cross-coupling between output waveguides, reducing the likelihood that a phase difference between the two will affect the splitting ratio therebetween. The Y-branch 10 may be a Silicon-on-Insulator (SOI) structure.

The gap 32 spaces the trailing ends 27, 29. Spacing the waveguides 28, 30 apart in this manner reduces evanescent coupling between the two. The gap 32 is formed by a blunt segment, used in fabrication, that eliminates the sharp edge that otherwise would result from depositing and etching the waveguides 28, 30. The blunt segment, in this example, is a rectangular mask centered about the axis, A. The blunt may be separate from or part of the masking used to form the general Y-branch output waveguides and straight input waveguide. With the use of a blunt segment, less accurate lithography fabrication techniques may be used. Nevertheless, the blunt segment is optional and may be replaced with other suitable structures or methods or eliminated entirely. Further, the size of gap 32 may be increased or reduced or the gap 32 may be eliminated, leaving the two trailing edges 27, 29 in contact at a sharp inner edge.

In operation, the input signal on section 12 is coupled into the linear taper section 14, which expands the fully excited fundamental mode for coupling into the waveguides 28, 30. The straight section 22 is before the gap 32 (and trailing edges 27 and 29). The illustrated straight section 22 has a lateral width equal to that of the leading edge 20 and allows the signal at the leading edge 20 to couple into the output waveguides 28 and 30 with less loss than other structures formed from blunt sections. Whereas, blunt sections alone may result in substantial signal loss (e.g., over 3% input intensity loss in each output branch), with the straight section 22, the Y-branch coupling becomes nearly adiabatic (e.g., with coupling of 49.5% of the input intensity into each output branch).

Figure 2:
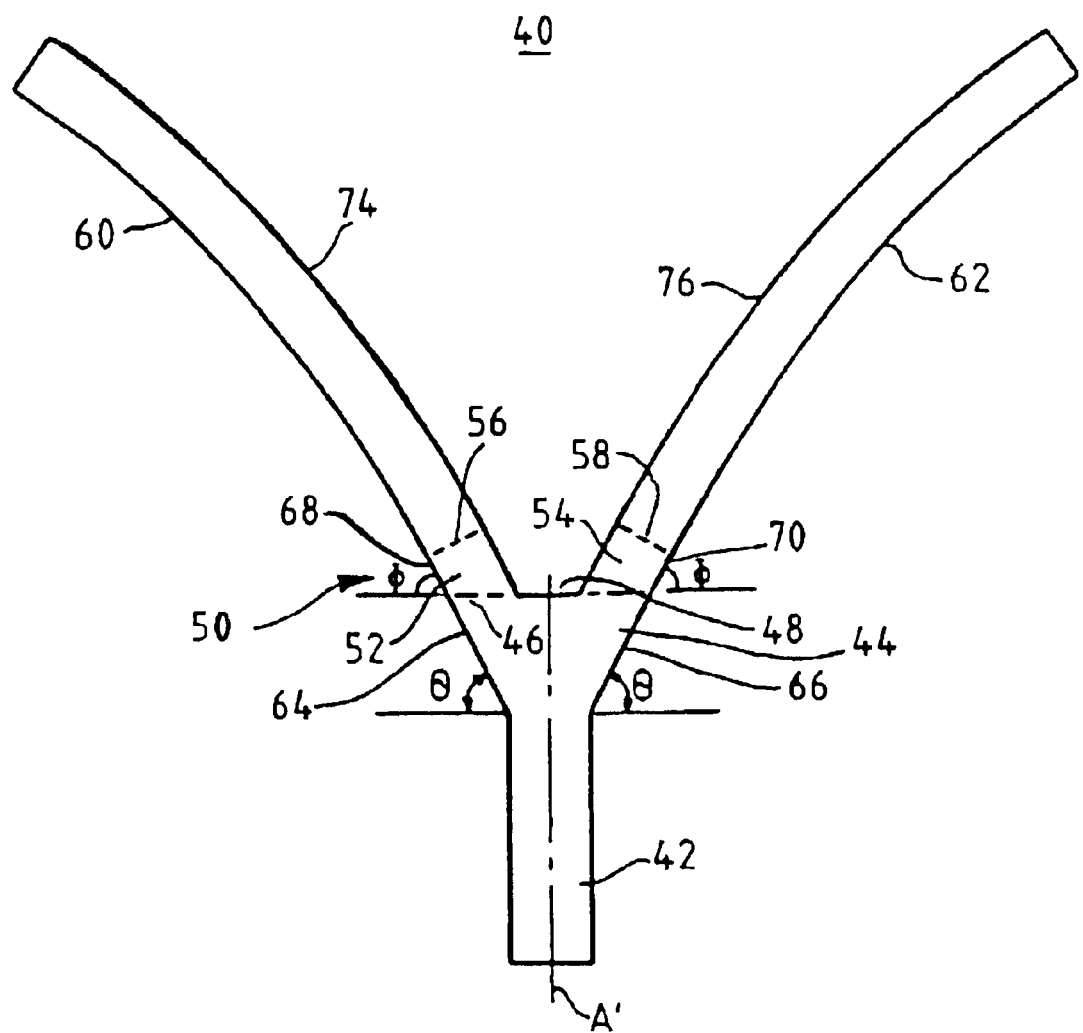
FIG. 2 is a top view of an example Y-branch having a second straight section.

Y-branch operation is greatly improved with the use of a straight section between the taper section and the branching output waveguides. In the example of FIG. 1, straight section 22 is shown trailing the blunt-induced gap 32. Alternatively, a straight section may be placed leading the gap, i.e., between the gap and the two output waveguides. An example of such a structure is shown in FIG. 2 where Y-branch 40 has an input section 42 and a linear taper section 44, similar to those shown in FIG. 1. At the leading edge of the taper section 44—indicated by dashed-line 46—there is a gap 48 that has been formed during fabrication, via a blunt segment. As with the gap 32, the width of the gap 48 depends upon the placement of the blunt during fabrication, the shape of the mask, and/or the quality of the lithography process used.

Gap 48 intersects a straight section 50, leading the gap 48. The straight section 50 is shown having a width at its trailing edge that equals the width of the linear taper section 44 at its leading edge. The straight section 50 is formed of two short straight sections 52, 54 that diverge more quickly from one another than do the trailing ends of waveguides 28 and 30, because of the branching angle and the zero-radius-of-curvature structures at the gap 48. The two straight sections 52, 54 fan-out from the propagation axis, A', of section 42. In the illustrated example, the straight sections 52 and 54 end at dashed lines 56 and 58, respectively, from which two curved output waveguides 60, 62 extend, respectively. The branching waveguides 60, 62 may be S-bend waveguides, for example. In the example shown in FIG. 2, however, the waveguides 60, 62 are not typical S-bends, but instead start with larger branching angles and smaller radii of curvature, at the trailing edges 56 and 58. This configuration accommodates for the divergence introduced by the taper section 44 and matches the phase front that best fits the diverging field.

To ensure low loss, the radius of curvature for the rest of the S-bends, i.e., beyond a initial region near the trailing edges, may be set lower than at the start of the S-bend, at the trailing edge of the branching waveguides. A cosine S-bend or another shape without a large step in curvature are examples. The structure shown produces high throughput without sacrificing space and without having larger-than-necessary phase sensitive sections in the branching waveguides 60, 62 at the gap 48. The waveguides 60, 62 may bring their signals into the original propagation direction, A'.

The linear taper segment 44 has outer walls 64, 66 each forming an angle, $\theta$, with an axis orthogonal with the propagation axis, A'. Straight section 50 includes outer walls 68 and 70 that form an angle $\phi$, as shown. Though angles $\phi$ and $\theta$ may be identical, in the illustrated example $\phi$ is slightly smaller, i.e., the walls 68 and 70 fan-out more than walls 64 and 66.

For the example illustrated in FIG. 2, the dashed lines 56 and 58 form angles with the line 46, as shown, i.e., the trailing edges of the branching waveguides 60, 62 are angled with respect to a normal to the direction of propagation, A'. Angling these trailing edges of the output waveguides 60, 62 results in more efficient coupling of the diverging field from the straight section 50 into the output waveguides 60, 62.

As provided above, many Y-branch structures are formed of regions extremely susceptible to lithography defects. An example in known devices is the region over which branching waveguides meet. With the structure of FIG. 2, however, the waveguides 60 and 62 may be formed with larger branching angles than otherwise used, an advantage primarily due to the fanning-out the straight sections 52, 54. Larger branching angles not only result in smaller-sized structures—a desire for most communications environments—they also reduce the Y-branch region susceptible to lithography defects. And, with the reduction in this susceptibility region, lesser-quality lithography techniques may be used without sacrificing device performance.

The example illustrated in FIG. 2 demonstrates additional advantages. In the structure of FIG. 2, the straight section 50 shifts the optical field toward the larger-radius-of-curvature walls of the branching waveguides (i.e., the walls 74 and 76 having the larger radii of curvature). This shift allows light that has not split optimally to still efficiently couple into the output waveguides 60, 62. Coupling or insertion loss is also reduced.

The example Y-branch 40 is particularly useful for Y-branches having small waveguide core widths (i.e., widths below 6 $\mu$m), narrow bend radii, and higher contrast index of refraction. With prior techniques such small core widths were unachievable in Y-branch design, because of the losses at the blunt region and coupling errors at the trailing edges of the output waveguides. Yet, by way of example, 3 $\mu$m and below core sizes (e.g., 3 $\mu$m×3 $\mu$m core cross-sections) may be used to form silica Y-branches of the patterns described. It will be appreciated by persons of ordinary skill in the art that even smaller core sizes may be used with silica, Indium Phosphide, or other materials, as desired.

In additional to small core sizes, the example of FIG. 2 uses a small bending radius in the waveguides 60, 62 at their trailing edges to shift the coupled energy toward the outer edge (i.e., walls 74 and 76, respectively). Bend radii below 3 mm are generally used, though this range is only an example. Bend radii below 1 mm may be desired for certain applications. Optimum values for core sizes and bend radii will depend upon the material used and may be set to achieve a designed performance level. A prophetic example for a Y-branch in the configuration of branch 40 is described below.

EXAMPLE

The branching waveguides and the input waveguide have rectangular cross-sections—taken orthogonal to the propagation axis of section 42—of a width of approximately 3 $\mu$m and a height of approximately 3 $\mu$m. The linear taper section 44 was approximately 75 $\mu$m in length, measured along the propagation axis of the input waveguide and expanded to a width of 7 $\mu$m at its maximum. An approximately 3° taper angle (measured from the an input propagation axis) was used. Each straight section was approximately 20 $\mu$m in length, as measured along the propagation axis starting at the gap position, and each straight section formed an angle with propagation axis of approximately 3°. The gap had a width of between 0.5 to 1 $\mu$m, and the radius of curvature on the portions of the branching waveguides at their trailing edges was approximately 1500 $\mu$m.

In any event, the use of a straight section between the taper region and the output waveguides, as shown in FIGS. 1 and 2, is advantageous over the prior art. Device performance is increased with larger amounts of the input energy being coupled into the branching waveguides. More compact splitters may be formed because larger branching angles may now be used without increased loss. And, in some examples, straight sections will greatly reduce the evanescent coupling between trailing portions of the two branching waveguides. Also, with the linear taper region forcing the input field to a maximum expansion and with the blunt section splitting the received mode into two, introducing the short straight sections before the mode has established itself in the two branching waveguides allows for better mode overlap with the waveguides and, therefore, better Y-branch operation.

Figure 3:
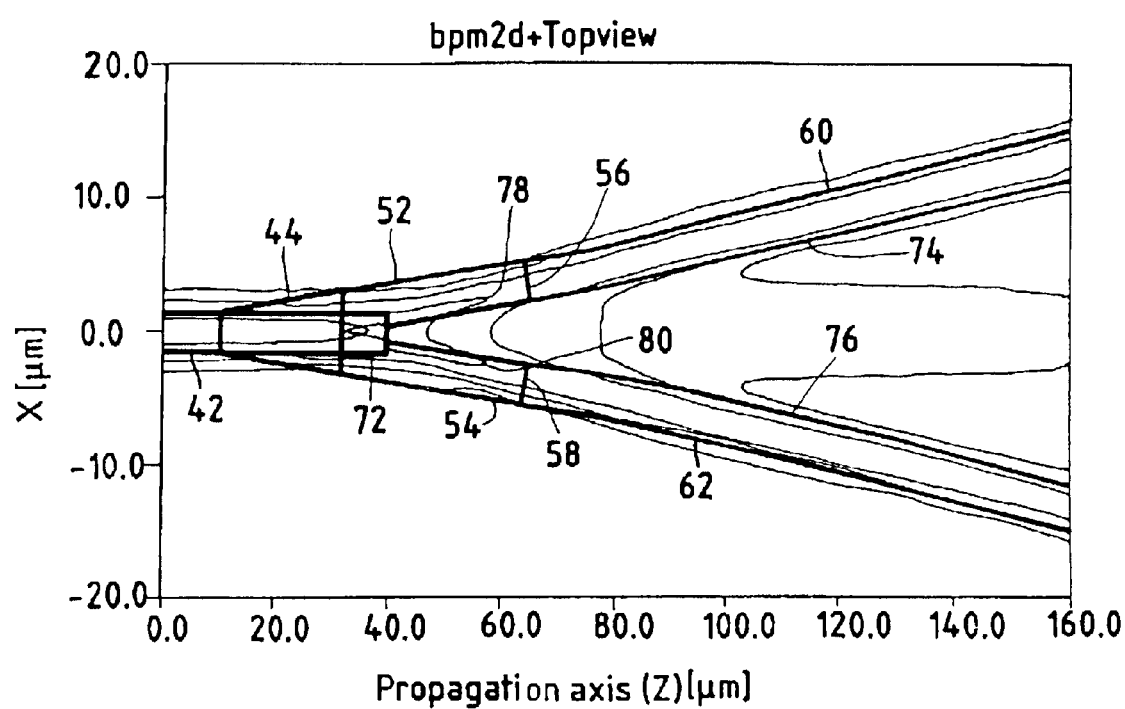
FIG. 3 is a plot of a Beam Propagation Method simulation for a Y-branch similar to that of FIG. 2 showing a blunt section and other portions of a Y-branch structure.

FIG. 3 shows an illustration of an example beam propagation method (BPM) simulation in which the geometry of the various Y-branch sections similar to that of FIG. 2 are indicated with like reference numerals. Here an exemplary blunt section 72 is also shown. The plot was done using Prometheus DV software, available from Alcatel Optronics Netherlands (Alcatel Optronics Netherlands BV, Colosseum 11, 7521 PV Enschede, The Netherlands), though any beam propagation method software could have been used. The plot shows a 2D-BPM in which the contour map represents the modal energy/intensity in a given cross section of the Y-branch. As will be observed, the mode of the input signal widens in the linear taper section 44 and at the leading edge of the blunt section, the mode profile is maximized in the center of the input waveguide 42, i.e., between the two output waveguides 60, 62. In the short straight sections 52 and 54, however, the field starts to localize toward the two branching waveguides 60 and 62 and is in fact coupled toward the outer walls 74 and 76 (exemplarily shown by field peaks 78 and 80), which results in more efficient launching of the modal energy into these bent output waveguides. The angled-nature of edges 56 and 58 also facilitates optimum coupling of this modal energy.

Figure 4:
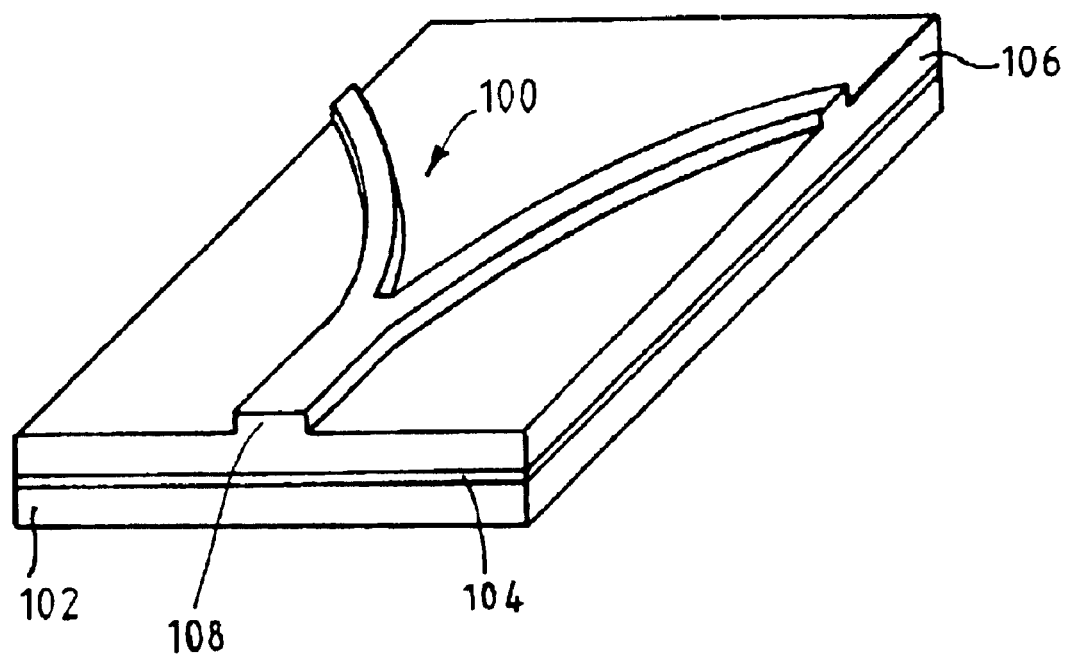
FIG. 4 is an illustration of an example Y-branch formed in a silicon-on-insulator (SOI) configuration.

Known materials may be used to form the Y-branches described herein. FIG. 4 shows an illustration of a fabricated Y-branch 100, which is a SOI structure. In fabrication, initially a substrate layer 102 is formed, for example by supplying a silicon wafer. An oxide buffer layer 104 is deposited on, grown on, or doped in the top of the substrate 102. Suitable silicon oxides are well known to persons of ordinary skill in the art. A silicon material layer 106, for example, a doped or undoped silicon, grown on the oxide buffer layer 104. The silicon material layer 106 is patterned and etched, through known lithography techniques, to form the desired Y-branch pattern 100. The top and side surfaces of the Y-branch 100 may be exposed or in contact with another material having a lower index of refraction. Due to the lower index of refraction of the material on the outer surfaces of the Y-branch 100 and due to the lower index of refraction of the oxide layer 104, mode confinement will occur substantially in region 108, extending through the Y-branch waveguides. As will be appreciated, these fabrication processes may be used to batch fabricate individual Y-branches.

Other materials may be used in place of the SOI structure. For example, materials that offer very high contrast in index of refraction across different dopants (e.g., Silicon Oxynitride, some of the known (doped) III-V semiconductor materials like Indium Phosphide(InP) based materials, and even heavily Ge-doped Silica and polymer waveguides) may be used when forming Y-branches having small core widths, i.e., sub-6 $\mu$m widths and specifically sub-4 $\mu$m widths, like Y-branch 40. Known Y-branch forming lithography techniques may be used to form these small core structures, as well.

Figure 5:
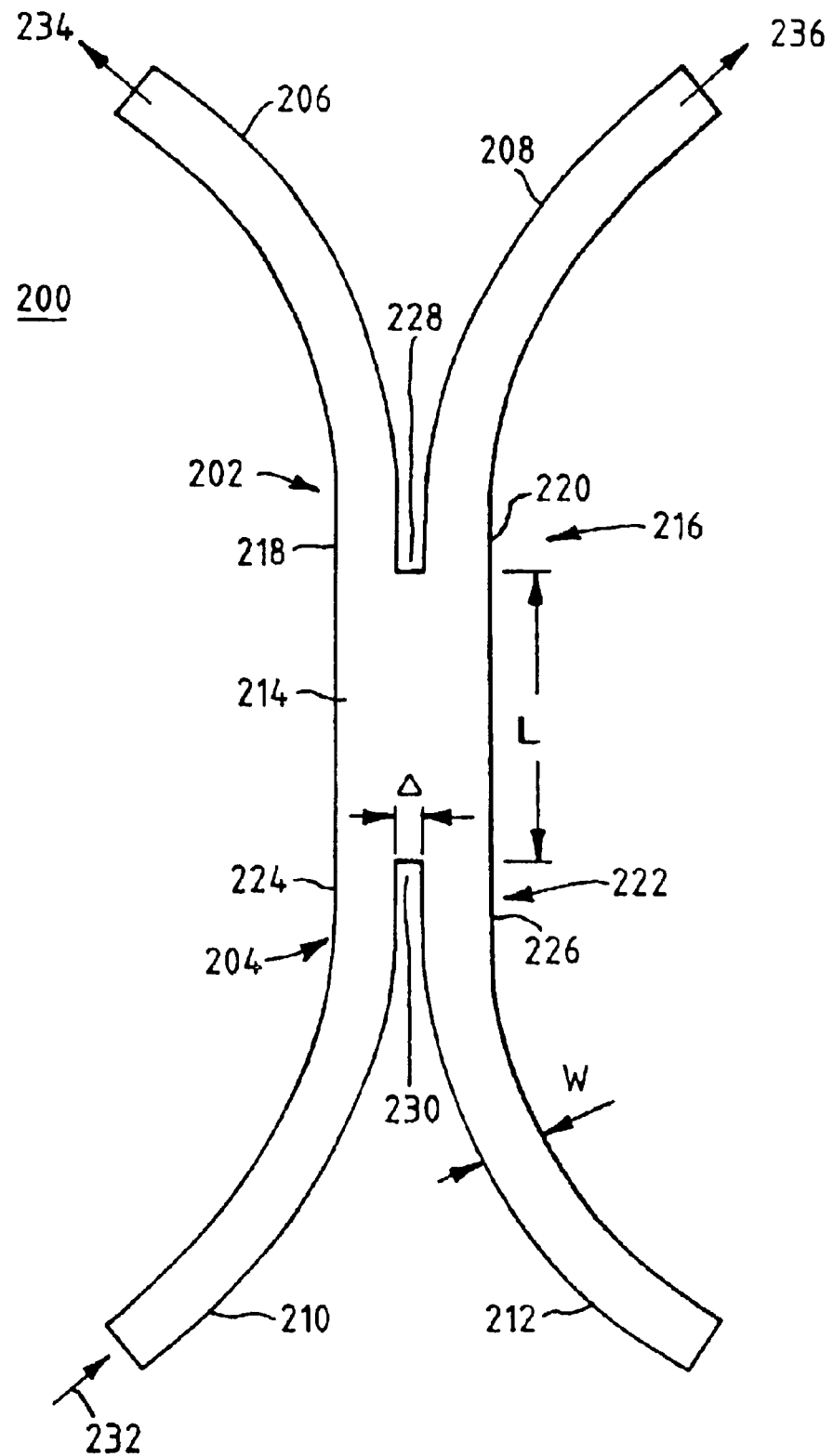
FIG. 5 is an illustration of an example 2×2 optical coupler employing Y-branches.
Figure 6:
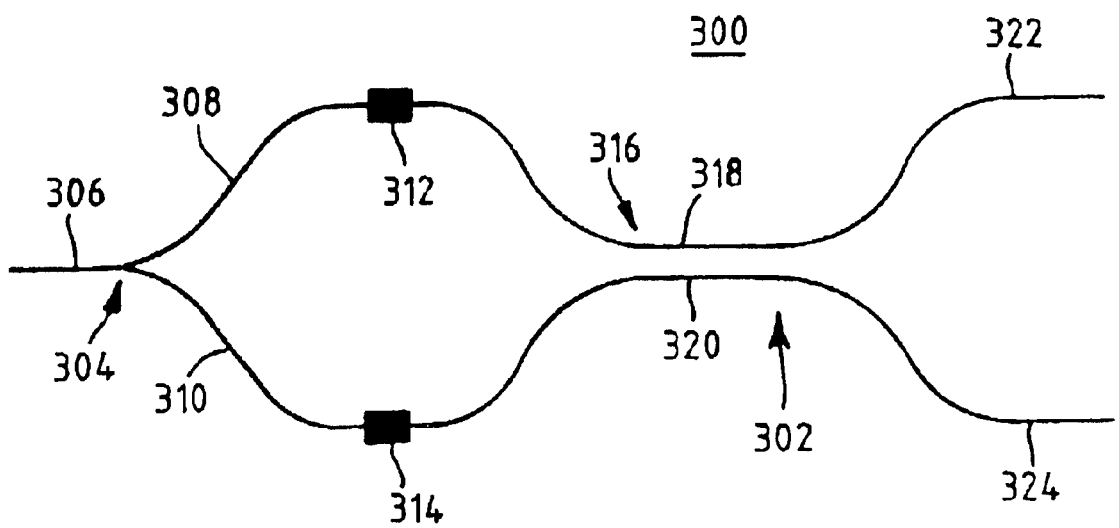
FIG. 6 is an illustration of an example 1×2 optical switch employing a Y-branch.
Figure 7:
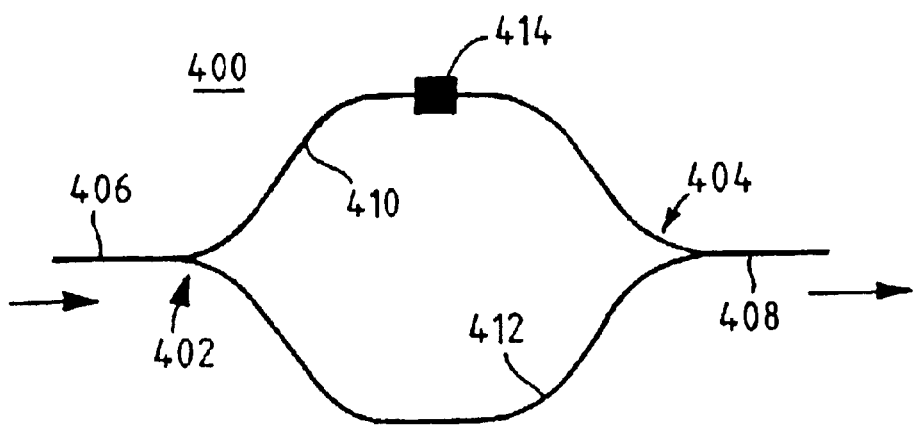
FIG. 7 is an illustration of an example optical switch or variable optical attenuator (VOA) employing a Y-branch.

The Y-branches described herein may be used separately or combined into more complex optical structures of which FIGS. 5–7 are examples. FIG. 5 shows a 2×2 coupler 200 formed of two Y-branch regions 202, 204 each having two branching output waveguides 206, 208 and 210, 212, respectively. The coupler 200 also includes a coupling section 214, such as a fused intersection of two existing waveguide cores or a fabricated propagation region comprising two pairs of extending waveguides. A straight section 216 extends between the branching waveguides 204, 208 and one end of the coupling section 214. The straight section 216 is formed of two short straight sections 218 and 220 similar to sections 52 and 54 of FIG. 2, except that, in the example shown, the former are substantially parallel and do not fan-out from a general direction of propagation within the section 214. The sections 218 and 220 may alternatively fan-out. A second straight section 222 is formed between waveguides 210, 212 and the other end of the coupling section 214 and includes short, parallel straight sections 224, and 226. Short sections 224, 226 alternatively may fan-out as shown in FIG. 2, as well.

The waveguides in each Y-branch are spaced apart at their ends by a gap, gap 228 for Y-branch 202 and gap 230 for Y-branch 204. The gaps 228 and 230 may have varying lengths and may be eliminated entirely. The coupler 200 also includes the coupling section 214 of length, L, and a thickness, 2W+Δ, where W is the width of each of the branching waveguides and Δ is the width of the gaps 228 and 230 therebetween. To control operation, the gaps 228 and 230 may have different widths.

Though the Y-branches 202 and 204 are shown having straight sections between a gap and the branching waveguides, it will be understood by persons of ordinary skill in the art that a 2×2 coupler may be formed using any of the Y-branches described herein, including Y-branches 10 and 40. In some such examples, the coupling section itself may include a taper section and one or more straight sections. Furthermore, the two Y-branches 202 and 204 need not be identical, though identical structures are illustrated.

The operation of the 2×2 coupler 200 is generally as follows. An input signal 232 is provided to waveguide 210, for example, and that input energy is coupled into one of two output signals 234 and 236 by the Y-branch 202. The geometry of the coupler 200, as well as any optical path-length controlling mechanism (such as applying a thermal change to the coupling section 214) determines into which output waveguide the input power is directed. By setting the coupling length, L, of the section 214, the input power will be coupled into output waveguides 206, 208 with a desired output power splitting ratio. For example, the 2×2 coupler will be a 3-dB coupler if the coupling length is chosen so that the output powers are the same in waveguides 206 and 208. The structure shown is a symmetric structure, though it need not be. Further, the structure may be formed with an SOI structure. Numerous ways to alter the coupling of section 214 will be known to persons of ordinary skill in the art, including ways to form a splitter using the structure shown.

FIG. 6 shows a 1×2 switch 300 formed of a single Y-branch 304 and another type of 2×2 coupler, reference numeral 302. Y-branch 304 may be any type of Y-branch described herein. In operation, the Y-branch 304 receives an input signal via input waveguide 306 and couples equal portions of its energy into branching arms 308 and 310. Phase shifters 312 and 314 (e.g., in the form of temperature controlling metal pads) are formed over the branching arms 308 and 310, respectively, to controllably induce a phase difference between the two arms, which are brought back into coupling contact over an interacting region 316 having two evanescently coupled straight segments 318 and 320. The straight segments 318, 320 define an interaction length over which phase mismatch between the arms 308 and 310 will result in interference to route the input signal to either one of two output waveguides 322, 324, depending upon that phase mismatch. By way of example, the length of the interaction region 316 may be set such that a $\pi/2$ phase shift between arms 308 and 310 couples all of the input signal energy from input waveguide 306 into output waveguide 322 and where a $-\pi/2$ or $3\pi/2$ shift couples all of the input energy into output waveguide 324. The phase difference induced by shifters 312 and 314 may also be due to plasma optical effects in silicon, in which a drive voltage induced free-carrier density change in silicon results in a refractive index change in that silicon. Generally, any optical device or component that would benefit from a splitter or combiner is contemplated for the examples herein.

Another exemplary structure is shown in FIG. 7 which has an optical switch 400 (or variable optical attenuator) formed of two opposing Y-branches 402 and 404, each having input/output waveguides 406 and 408, respectively, and each sharing branching output waveguides via arms 410, 412. Each of the Y-branches 402 and 404 further includes a linear taper section and a straight section between the linear taper section and the branching waveguides as shown above in FIGS. 1–5. A phase-shift-inducing element 414 is placed on one (or both) of the arms 410, 412, such that by controlling the phase difference between the two arms 410, 412 the split signals will either interfere constructively or destructively when recombined to form either a high signal or no signal at the output, which is waveguide 408 in the illustrated example. Thus, by controlling the phase shift, this two-Y-branch structure forms an optical logic gate or binary switch. Further, controlling the phase shift to achieve interference somewhere between purely destructive and purely constructive interference, the structure 400 functions as a variable optical attenuator having an output intensity that varies between a maximum value and a substantially flat, no signal value.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What we claim is:

1. An optical apparatus, comprising:
   an input waveguide section having a propagation axis and a first width;
   a linear taper section coupled to the input waveguide section, the linear taper section having a first edge having a width equal to the first width and a second edge having a second width greater than the first width, wherein the linear taper section tapers at a first angle relative to the propagation axis;
   a first branching waveguide;
   a second branching waveguide, and
   a straight section including a first straight segment extending between the first branching waveguide and the linear taper section and a second straight segment extending between the second branching waveguide and the linear taper section, wherein the first straight segment has a first inner wall and wherein the second straight segment has a second inner wall, wherein the first straight segment and the second straight segment fan-out from a gap between the first inner wall and the second inner wall at the linear taper section, and wherein the first straight segment and the second straight segment fan-out at a second angle different than the first angle, wherein a first trailing edge of the first branching waveguide forms an acute angle with the propagation axis and wherein a second trailing edge of the second branching waveguide form an acute angle with the propagation axis.

2. The apparatus of claim 1, wherein the first branching waveguide and the second branching waveguide are curved.

3. The apparatus of claim 2, wherein the first branching waveguide and the second branching waveguide are curved away from the propagation axis.

4. The apparatus of claim 1, wherein the straight section has outer walls disposed at an acute angle to the propagation axis.

5. The apparatus of claim 1, wherein the input waveguide and the first branching waveguide and the second branching waveguide have equal width, and that width is below 4 µm.

6. An optical apparatus comprising:
an input waveguide section having a propagation axis;
a linear taper section coupled to the input waveguide section, the linear taper section has a first wall and a second wall each fanning out from the propagation axis at a first angle;
a first branching waveguide having a first trailing edge acutely angled with the propagation axis;
a second branching waveguide having a second trailing edge acutely angled with the propagation axis; and
a straight section coupled between the linear taper section and the first trailing edge of the first branching waveguide and the second trailing edge of the second branching waveguide, the straight section defining a third wall and a fourth wall each fanning-out from the propagation axis at a second angle, wherein the straight section has a first straight segment and a second straight segment spaced apart, by a gap, at the linear taper section, wherein the first angle does not equal the second angle.

7. The optical apparatus of claim 6, wherein the first straight segment is coupled to the first branching waveguide and the second straight segment is coupled to the second branching waveguide.

8. The optical apparatus of claim 6, wherein the first branching waveguide, the second branching waveguide, and the input waveguide each have core sizes at or below 4 µm×4 µm.

9. The optical apparatus of claim 8, wherein the first branching waveguide has a radius of curvature for a first outer wall less than 3 mm and wherein the second branching waveguide has a radius of curvature for a second outer wall less than 3 mm.

10. An optical switch comprising:
a Y-branch having,
an input waveguide having a propagation axis and a first width, a linear taper section coupled to the input waveguide, the linear taper section having a first edge having a width equal to the first width and a second edge having a second width greater than the first width, wherein the linear taper section tapers at a first angle relative to the propagation axis,
a first branching waveguide,
a second branching waveguide, and
a straight section including a first straight segment extending between the first branching waveguide and the linear taper section and a second straight segment extending between the second branching waveguide and the linear taper section, wherein the first straight section has a first inner wall and wherein the second straight segment has a second inner wall, wherein the first straight segment and the second straight segment fan-out from a gap between the first inner wall and the second inner wall at the linear taper section, and wherein the first straight segment and the second straight segment fan-out at a second angle different than the first angle, wherein a first trailing edge of the first branching waveguide forms an acute angle with the propagation axis and wherein a second trailing edge of the second branching waveguide forms an acute angle with the propagation axis; and
two output waveguides coupled to the Y-branch for selective routing of an input signal from the input waveguide to one of the two output waveguides.

11. The optical switch of claim 10, further comprising a phase shifting element coupled to the Y-branch, such that changes to the phase shifting element selectively route the input signal from the input waveguide to the one of the two output waveguides.

12. The optical switch of claim 10, wherein at least one of the two output waveguides is couped to at least one of the first branching waveguide or the second branching waveguide via evanescent coupling.

13. An optical device comprising:
a first Y-branch having,
an input waveguide having a propagation axis,
a linear taper section coupled to the input waveguide section, the linear taper section having a first wall and a second wall each fanning out from the propagation axis at a first angle,
a first branching waveguide having a first trailing edge acutely angled with the, propagation axis,
a second branching waveguide having a second trailing edge acutely angled with the propagation axis,
a straight section coupled between the linear taper section and the first trailing edge of the first branching waveguide and the second trailing edge of the second branching waveguide, the straight section defining a third wall and a fourth wall each fanning-out from the propagation axis at a second angle, wherein the straight section has a first straight segment and a second straight segment spaced apart, by a gap, at the linear taper section, wherein the first angle does not equal the second angle; and
a second Y-branch having an output waveguide and a pair of branching arms, wherein the first branching waveguide is coupled to one of the pair of branching arms and wherein the second branching waveguide is coupled to the other of the pair of branching arms.

14. The optical device of claim 13, further comprising a phase shifting element disposed to selectively control the amount of an input signal at the first input waveguide that is coupled to the output waveguide.

15. The optical device of claim 13, wherein the input waveguide and the output waveguide are centered about a propagation axis.

* * * * *

UNITED STATES PATENT AND TRADEMARK OFFICE
CERTIFICATE OF CORRECTION

PATENT NO. : 6,970,625 B2
APPLICATION NO. : 10/193798
DATED : November 29, 2005
INVENTOR(S) : Ansheng Liu et al.

It is certified that error appears in the above-identified patent and that said Letters Patent is hereby corrected as shown below:

Col. 8, line 58, please delete "waveguide form an acute angle" and insert --waveguide forms an acute angle--.

Col. 9, line 53, please delete "first straight section has a first inner wall" and insert --first straight segment has a first inner wall--.

Col. 10, line 19, please delete "waveguide is couped to at least" and insert --waveguide is coupled to at least--.

Col. 10, line 24, please delete "an input waveguide having a propagation axis" and insert --an input waveguide section having a propagation axis--.

Col. 10, line 30, "acutely angled with the, propagation axis" should be --acutely angled with the propagation axis--, Signed and Sealed this Fifth Day of December, 2006

JON W. DUDAS
*Director of the United States Patent and Trademark Office*